SIGNAL TRANSMISSION SYSTEMS EMPLOYING ANGLE MODULATION

Filed Feb. 2, 1962 2 Sheets-Sheet 1

INVENTOR
IVOR A. RAVENSCROFT
BY Hall & Houghton
ATTORNEY

INVENTOR
IVOR A. RAVENSCROFT,
BY Hall & Houghton
ATTORNEY

United States Patent Office 3,213,367
Patented Oct. 19, 1965

3,213,367
SIGNAL TRANSMISSION SYSTEMS EMPLOYING ANGLE MODULATION
Ivor Albert Ravenscroft, Radlett, England, assignor to Her Majesty's Postmaster General, London, England
Filed Feb. 2, 1962, Ser. No. 170,621
Claims priority, application Great Britain, Feb. 3, 1961, 4,245/61
3 Claims. (Cl. 325—45)

The present invention relates to signal transmission systems more particularly systems employing frequency or phase modulation.

In broadband frequency or phase modulation systems carrying large numbers of channels, the modulation index is very small, for instance the deviation recommended for a 1800-channel system is 140 kc./s. per channel, which with a frequency modulation band width of 8.2 mc./s., leaves the bulk of the energy of the signal in the carrier, the energy in the frequency modulation side bands being some 17 db lower than that in the carrier. To use frequency modulation at its greatest advantage for multichannel signals requires a prohibitively large modulation bandwidth for high capacity systems, a modulation index of at least unity being desirable.

Transmission systems employing frequency or phase modulation are known as angular modulation transmission systems and for angular modulation to be advantageous compared with amplitude modulation a reasonably high modulation index is required. However, the disadvantages of increasing the modulation index in known systems using angular modulations are:

(a) increased bandwidth of the channels
(b) more stringent linearity required of phase/frequency characteristics
(c) more stringent linearity required of the modulator/demodulator transfer characteristics.

It is an object of the invention to provide an improved angular modulation transmission system and according to the invention an angular modulation transmission system in which a carrier frequency is modulated in frequency with or without pre-emphasis, or is modulated in phase with or without de-emphasis, is provided with means at the transmitter for reducing the amplitude of the carrier component before transmission and means at the receiver for increasing the amplitude of the carrier component relative of the frequency modulated side bands. Conveniently the said increasing means restores the amplitude of the carrier to its initial relative value prior to reduction at the transmitter.

Thus in a system according to the invention the transmitter power can be considerably reduced without affecting the overall signal to noise ratio and the reduction of carrier power has the effect of increasing the modulation index without increasing the channel bandwidth and without increasing the stringency of the design tolerances in the equipment.

The linearity already available in some known angular modulation systems is adequate for the application of the principles of the present invention.

The invention may also find application in long distance transmission systems using the medium of tropospheric or ionospheric scatter propagation or by reradiation from passive or powered satellites.

In radio transmission systems using angular modulation the modulation index is necessarily small, because of the considerations of either bandwidth or phase linearity or both. In such cases, the bulk of the energy transmitted is carrier power and for example with a modulation index of 0.1 the sideband energy is —23 db relative to the carrier power. To increase sideband energy by increasing the modulation index, results in an increase of bandwidth and of more stringent phase linearity tolerances. On the other hand, the transmission of such a signal entails the radiation of unnecessary power since the intelligence transmitted is only in the sidebands.

The invention will now be described with reference to the accompanying drawings in which.

Figure 3:
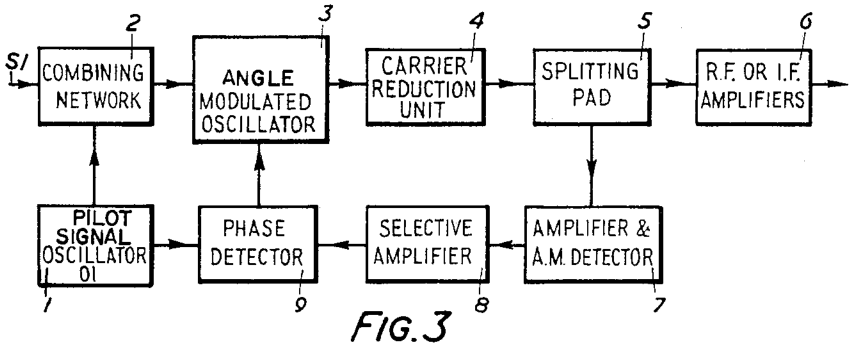
Figure 4:
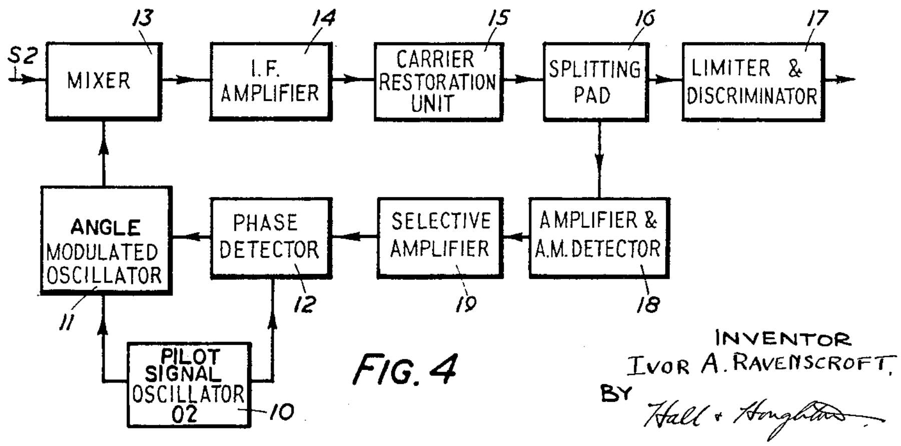
Figure 5:
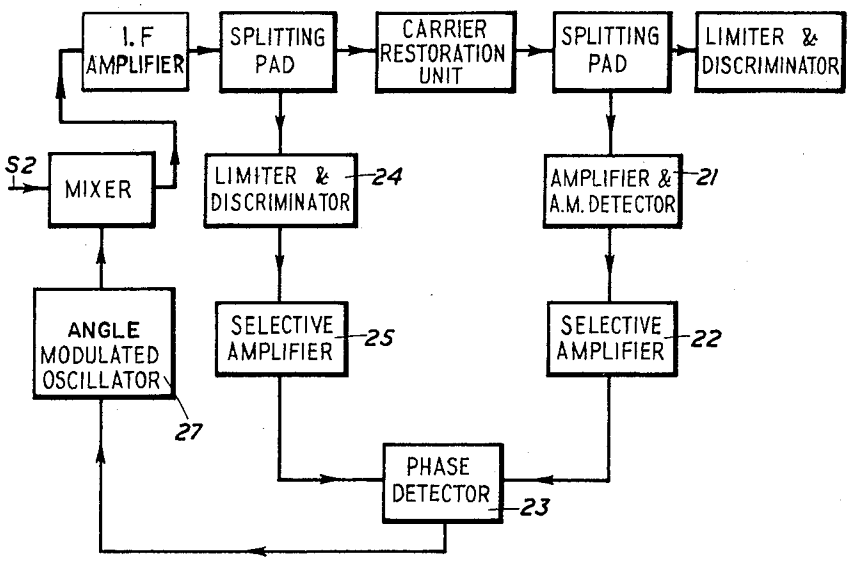
Figure 6:
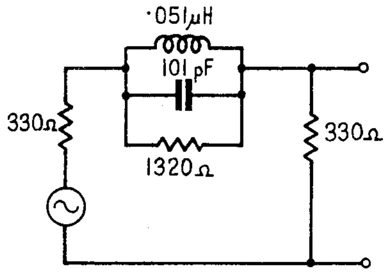
Figure 7:
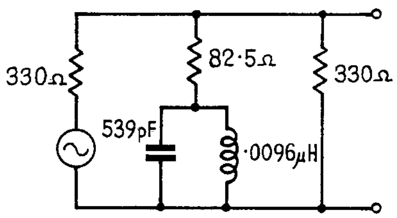
Figure 8:
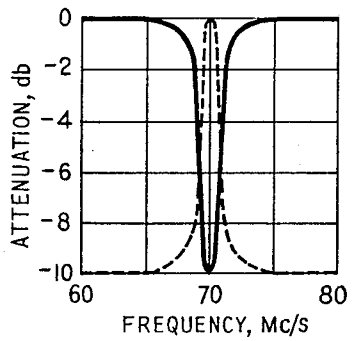

FIGURE 3 is a block schematic of one arrangement embodying a carrier reduction unit for use in carrying the invention into effect, FIGURE 4 is a block schematic of one arrangement embodying a carrier restoration unit for use in carrying the invention into effect, FIGURE 5 is a block schematic of an alternative arrangement to that of FIGURE 4, FIGURE 6 is a typical circuit of a carrier reduction arrangement, FIGURE 7 is a typical circuit of a carrier restoration arrangement, and FIGURE 8 shows typical insertion-loss/frequency characteristics for the circuits of FIGURES 6 and 7.

Figure 1:
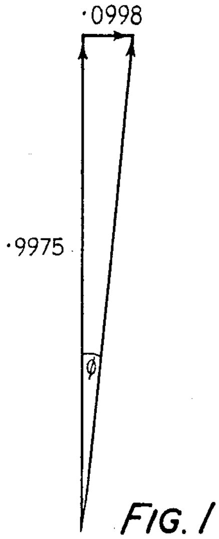
FIGURE 1 is a vector diagram of the addition of a carrier and the resultant sidebands in the known transmission systems.
Figure 2:
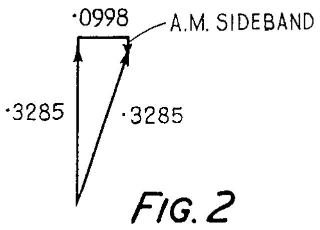
FIGURE 2 is a vector diagram similar to that of FIGURE 1 but showing the effect of reducing the carrier amplitude.

Referring to the drawings, FIGURE 1 shows the vector addition of a carrier and the resultant sideband, together giving the phase deviation $\phi$. Since the modulation index is small, the error involved in the exclusion of second and higher order components is negligible. FIGURE 2 shows the effect of reducing the carrier amplitude. The vector addition of the reduced carrier and sidebands results in the introduction of a small amount of amplitude modulation and this amplitude modulation has side frequency components which cancel those which would be produced in a purely angular modulated signal having a higher modulation index. It is thus necessary to preserve the amplitude modulation component, otherwise an increase of frequency spectrum and bandwidth requirement occurs. However, the amplitude linearity required is not severe and as a typical example, the relative amplitudes of carrier and side frequencies are shown in the following table in which line 1 shows the amplitude of the residual carrier component and of the first and second order side frequency components for normal frequency modulation with a modulation index 0.1; line 2 shows the effect of reducing by 9.6 db the carrier frequency component of line 1; line 4 shows the amplitude of the residual carrier component and of the first and second order side frequency components for normal frequency modulation with a modulation index 0.3; and line 3 shows the amplitude of the carrier frequency component and of the first and second order side frequency components for the signal of line 2 when all of these amplitudes have been increased in a proportion such as to bring the amplitude of the carrier frequency component up to the value shown in line 4.

*Relative amplitudes of carrier and side frequencies for a frequency modulated and a reduced carrier F.M. signal*

| Modulating condition | Residual carrier | 1st order side frequencies | 2d order side frequencies |
|---|---|---|---|
| 1. Modulation index=0.1 | 0.9975 | 0.0499 | 0.0012 |
| 2. Carrier reduced 9.6 db | 0.3285 | 0.0499 | 0.0012 |
| 5. Carrier reduced 9.6 db (values normalized) | 0.9776 | 0.1483 | 0.0036 |
| 4. Modulation index=0.3 | 0.9776 | 0.1483 | 0.0112 |

Comparing the magnitude of the second order side frequency components of line 3 with those of line 4 it is seen that the amplitude modulation index thus produced is .0076, yet the characteristics of this reduced carrier F.M. signal is such that its effective modulation index is increased in nearly the same ratio as the carrier is reduced (since the first order side frequency components have the same value), but the group delay tolerances are substantially unchanged since the sideband spectrum is not affected, and the carrier is finally restored before demodulation takes place.

The reduced carrier frequency modulated system according to the invention therefore yields the following advantages:

(1) For a given signal-to-noise ratio and with a small modulation index, the total power required to be transmitted is reduced without increase of bandwidth. Thus for example if the carrier component power is reduced 10 db in the case where the modulation index is about 0.1 and the normal power is one watt, the total power transmitted is reduced to about 104 mw.

(2) With a given transmitting power and receiver noise factor, the system bandwidth may be reduced and the design tolerances eased. This may be accomplished by reducing the deviation, applying carrier reduction, and then increasing the transmitter gain to restore the power transmitted to the original level. In this case the design tolerances of the modulator and demodulator are also relaxed since these units operate at reduced deviation under the above conditions.

(3) With a given transmitter power and receiver noise factor, the system capacity can be increased. Up to the present, with radio relay systems carrying large numbers of telephone channels simultaneously, a 960-telephone channel system with an average deviation of 200 kc./s. per channel has been found practicable. If the capacity were to be increased to for example 2700 channels, then either the deviation per channel must be increased threefold or the radiated power increased ten times in order to maintain the necessary signal-to-noise ratio. However, if the carrier is reduced by some 10 db, then the sideband energy can be increased proportionately to obtain the required signal-to-noise ratio, without affecting substantially the F.M. design tolerances. Furthermore, if the carrier is reduced for example by 20 db, the deviation per channel can be reduced to allow a smaller bandwidth and easier design tolerances to be used. This is of particular advantage where systems are required to fit in with existing carrier frequency planning, and where the bandwidth allocation is already determined.

FIGURE 3 is a block schematic of a suitable arrangement for applying carrier reduction at the transmitting end of a signal transmission system and comprises a pilot signal oscillator 1 for generating a modulating signal O1 which is fed to a combining network 2 to which the baseband signal S1 is also applied, and the output from the combining network 2 is fed to an angle modulated oscillator 3 which is thereby deviated by a small amount. The frequency of the signal O1 is determined largely by the modulating baseband; the frequency for multi-channel radio relay systems should lie below the baseband and for high capacity multi-channel radio relay systems a value of about 100 kc./s. is preferred.

The modulated signal from the oscillator 3 is fed to a carrier reduction unit 4 the output of which passes through a splitting pad 5 to the system amplifiers 6. If the mean frequency of the oscillator 3 should tend to drift relative to the tuning of the carrier reduction unit the circuit operates as a frequency discriminator to the frequency modulated component produced by the signal O1 and the amplitude modulation produced as a result of this discrimination is detected by an amplifier an A.M. detector unit 7 connected to the splitting pad 5, the resultant signal being amplified by a selective amplifier 8 tuned to the fundamental signal O1, and then applied to a phase detector 9 to which the signal O1 is also fed from the oscillator 1.

With the arrangement of FIGURE 3, when the carrier is "in tune" the signal leaving the carrier reduction unit 4 will contain no amplitude modulation components as fundamental frequencies. The amplitude modulation present will consist of second harmonic components only. The selective amplifier 8 is tuned to the frequency of the signal O1, i.e., 100 kc./s., and since the original signal contained no 50 kc./s. component there will be no 100 kc./s. output from the selective amplifier 8. If the carrier is off tune with respect to the carrier-reducing filter there will be amplitude modulation at fundamental frequencies. Consequently there will be output at 100 kc./s. from the selective amplifier 8 and the phase of this output is dependent on the sense of the detuning.

The phase detector 9 gives a direct output voltage the polarity of which is dependent upon the direction of detuning of the carrier which output voltage is amplified and then applied to the oscillator 3 in the polarity required to effect the requisite frequency correction relative to the detuning of the carrier reduction unit 4.

The frequency of the oscillator 3 thus tends to lock on to the centre frequency where no fundamental amplitude modulation is produced.

FIGURE 4 shows an arrangement for receiving the reduced carrier signal and for restoring the carrier to its full value. In the arrangement of FIGURE 4 a signal O2 of the same frequency as the signal O1 of FIGURE 3 is generated by a pilot signal oscillator 10 and applied to a local angle modulated oscillator 11 and a phase detector 12. The signal O2 modulates the local oscillator and thus deviates the intermediate frequency carrier in the system receiver. The output from the local oscillator 11 is fed to a mixer 13 to which the incoming signal S2 is also applied and after amplification in an amplifier 14 passes through a carrier restoration unit 15 and splitting pad 16 to a limiter and discriminator unit 17 of the type normally used in broadband radio systems. In order to obtain automatic frequency control as in the case of the arrangement of FIGURE 3 the carrier restoration unit 15 is used as a reference and an output from the splitting pad 16, after amplification and detection in an amplifier and A.M. detecting unit 18, passes to a selective amplifier 19, the output of which is applied to the phase detector 12 which in the manner described with reference to the phase detector 9 of FIGURE 3, generates a frequency correcting voltage for application to the local oscillator 11.

In the alternative carrier restoration arrangement of FIGURE 5, the pilot signal oscillator 10 of FIGURE 4 is omitted. The arrangement of FIGURE 5 utilises the original modulating signal component O1 generated for the modulator frequency control shown in FIGURE 3, and consequently requires an amplifier and A.M. detector unit 21, selective amplifier 22 and phase detector 23 of the same design and operating at the same frequency as in the carrier reduction arrangement. In addition to these units, a further limiter-discriminator unit 24 and selective amplifier 25 are required to detect and amplify the modulation signal before it is applied to the carrier restoration unit and the detected signal thus obtained is used for phase comparison in the phase detector 23, the resultant out-of-phase voltage of which corrects the frequency of the local angle modulated oscillator 27. Conveniently the limiter-discriminator unit 24 is similar to the unit 17 of FIGURE 4 although it need not necessarily have as large a bandwidth.

The types of circuit used for carrier reduction and restoration may be simple narrow band stop and narrow band pass filters shown together with their terminating impedances in FIGURES 6 and 7 respectively. The values given for the components are for use in high capacity multi-channel telephony systems with an intermediate frequency of 70 mc./s. and the insertion loss/ frequency characteristics are shown in FIGURE 8 as having a carrier reduction of 10 db with half-loss frequencies at 70±1 mc./s. The full line curve of FIGURE 8 is the insertion loss/frequency characteristic of the carrier reduction circuit of FIGURE 6 measured between the terminating impedances shown, and the curve drawn in broken line in FIGURE 8 gives the insertion loss/frequency characteristic of the carrier restoration circuit of FIGURE 7 also measured between the terminating impedances shown. With 1800-channel loading, it was possible experimentally, using these networks, to reduce R.F. power without increasing the stringency of the design tolerances. The signal-to-intermodulation noise ratio caused by severe group delay distortion introduced artificially, was not adversely affected when carrier reduction and restoration units were employed.

I claim:

1. A frequency modulated transmission system comprising, in combination: a transmitting apparatus including an angle modulated oscillator, attenuator means in said transmitting apparatus for attenuating the center carrier frequency to reduce the amplitude thereof relative to the amplitude of the side band frequencies; a receiving apparatus for receiving signals transmitted by the transmitting apparatus and said receiver apparatus including means for increasing the amplitude of the center carrier frequency to restore the relation between the amplitude of the carrier frequency and of the side band frequencies to that pertaining before carrier reduction in the transmitting apparatus.

2. In a frequency modulated transmission system, a transmitting apparatus comprising a pilot signal oscillator for generating a modulating signal, a combining network for combining the modulating signal and the baseband signal, an angle modulated oscillator connected to the combining network for receiving the output therefrom and to be deviated thereby, a carrier reduction unit connected to the output of the angle modulated oscillator and an amplifier fed from the output of the carrier reduction unit, said apparatus further comprising an amplitude modulation detector connected to the output of the carrier reduction unit, a phase detector connected to the output of the amplitude modulation detector and to the pilot signal oscillator for detecting, de-tuning of the angle modulated oscillator relative to the carrier reduction unit, and for applying a frequency correcting signal to the angle modulated oscillator.

3. In a frequency modulated transmission system, a receiving apparatus comprising a pilot signal oscillator for generating a modulating signal for application to an angle modulated oscillator thereby to deviate the carrier frequency of the received signal, a mixer for receiving the output of the angle modulated oscillator and the incoming signal, an amplifier fed from the output of said mixer, and a carrier restoration unit connected to the output of the amplifier, said apparatus further comprising a phase detector connected to the output of the carrier restoration unit and to the pilot signal oscillator for detecting de-tuning of the angle modulated oscillator relative to the carrier restoration unit for applying a frequency correcting signal to the angle modulated oscillator.

References Cited by the Examiner

UNITED STATES PATENTS

| | | | |
|---|---|---|---|
| 2,205,762 | 6/40 | Hansell | 325—427 |
| 2,362,000 | 11/44 | Tunick | 325—46 X |
| 2,575,047 | 11/51 | Crosby | 325—328 |
| 2,738,380 | 3/56 | Crosby | 325—328 X |
| 2,907,831 | 10/59 | De Jager | 325—50 |
| 2,945,212 | 7/60 | Shekels et al. | 332—17 |
| 3,042,867 | 7/62 | Thompson | 325—50 |

FOREIGN PATENTS

| | | |
|---|---|---|
| 754,185 | 8/56 | Great Britain. |

OTHER REFERENCES

Black: "Modulation Theory," Van Nostrand, Inc., New York, pp. 168–169.

DAVID G. REDINBAUGH, *Primary Examiner.*

ROY LAKE, *Examiner.*